United States Patent [19]

Makowski et al.

[11] 4,137,203

[45] Jan. 30, 1979

[54] ZINC NEUTRALIZED SULFONATED ELASTOMERIC POLYMER

[75] Inventors: Henry S. Makowski, Scotch Plains; Douglas Brenner, Livingston, both of N.J.; Jan Bock, Houston, Tex.

[73] Assignee: Exxon Research & Engineering Co., Florham Park, N.J.

[21] Appl. No.: 855,553

[22] Filed: Nov. 29, 1977

[51] Int. Cl.² .................... C08L 91/00; C08K 5/01
[52] U.S. Cl. ..................... 260/23.5 A; 260/28.5 B; 260/33.6 AQ; 260/42.33; 260/42.47; 260/DIG. 31
[58] Field of Search ......... 260/23.7, 23.5 A, 33.6 AQ, 260/33.6 PQ, 28.5 B, 889, 42.33

[56] References Cited

U.S. PATENT DOCUMENTS

| | | | |
|---|---|---|---|
| 3,847,854 | 11/1974 | Canter et al. | 260/23.7 M |
| 3,974,240 | 8/1976 | Bock et al. | 260/897 B |
| 3,974,241 | 8/1976 | Lundberg et al. | 260/897 B |
| 4,014,831 | 3/1977 | Bock et al. | 260/23 H |

Primary Examiner—Lewis T. Jacobs
Attorney, Agent, or Firm—Richard E. Nanfeldt

[57] ABSTRACT

This invention relates to an improved elastomeric composition of zinc neutralized sulfonated EPDM terpolymers which are preferentially plasticized with zinc stearate at a minimum critical concentration level of at least 8 parts per hundred by weight based on 100 parts by weight of the zinc neutralized EPDM terpolymer, wherein the compositions have an improved balance of physical and rheological properties. These compositions can be readily processed due to their superior rheological properties on conventional plastic fabrication equipment.

11 Claims, 6 Drawing Figures

ZINC NEUTRALIZED SULFONATED ELASTOMERIC POLYMER

FIELD OF THE INVENTION

This invention relates to an improved elastomeric composition of zinc neutralized sulfonated EPDM terpolymers which are preferentially plasticized with zinc stearate at a minimum critical concentration level of at least 8 parts per hundred by weight based on 100 parts by weight of the zinc neutralized EPDM terpolymer, wherein the compositions have an improved balance of physical and rheological properties. These compositions can be readily processed due to their superior rheological properties on conventional plastic fabrication equipment.

BACKGROUND OF THE INVENTION

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728 herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated, for example, by means of a complex of a sulfur trioxide donor and a Lewis base. The $SO_3H$ groups of the sulfonated elastomer can be readily neutralized with a basic material to form an ionically cross-linked elastomer having substantially improved physical properties over an unsulfonated elastomer at room temperature. However, these ionically cross-linked elastomers, may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements. Although these sulfonated elastomeric polymers prepared by the process of this patent are readily useable in a certain number of limited applications, they are not as readily adaptable for the manufacture of an injection moldable elastomeric article such as footwear as are the improved compositions of the present invention, wherein both improved physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically cross-linked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer such as polystyrene by means of a polymer chain plasticizer which is a liquid compound having a boiling point of at least about 120° C. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions formed by this process of U.S. Pat. No. 3,870,841 are not as suitable for the manufacture of high performance elastomeric articles such as footwear formed by an injection molding process as are the compositions of the present invention.

U.S. Pat. No. 3,847,854, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer.

The concentrations of the non-volatile plasticizers are limited to an upper concentration of 6–7 weight percent because with the metal neutralized sulfonated elastomers of this invention, there would be plasticization of the polymeric backbone which would affect physical properties adversely. This invention fails to realize, imply, infer or distinguish the criticality of using zinc stearate as a preferential plasticizer but rather equates zinc stearate to many other less beneficial plasticizers. The inventive concept of the present instant invention clearly teaches the criticality of using zinc stearate as a preferential plasticizer at a minimum concentration level of at least about 8 parts per hundred by weight in order to achieve the desired physical and rheological properties. Additionally, U.S. Pat. No. 3,847,854 fails to realize the criticality of using a zinc cation to neutralize the $SO_3H$ groups in the sulfonated polymer in order to achieve an improved balance of physical and rheological properties. In fact, this patent clearly equates zinc to other metal cation and further fails to clearly demonstrate the use of zinc cations in order to obtain a superior balance of physical and rheological properties which are not attainable with other metal cations.

SUMMARY OF THE INVENTION

The present invention relates to improved compositions of zinc neutralized sulfonated EPDM terpolymers being preferentially plasticized with about 8 to about 60 parts per hundred by weight of zinc stearate based on 100 parts by weight of the zinc neutralized EPDM terpolymer, more preferably about 9 to about 40 and most preferably about 10 to about 30. These improved compositions have an improved balance of physical and rheological properties previously simultaneously unattainable by the teachings of the prior art. The compositions of the present invention are readily processed due to their superior rheological properties on conventional plastic fabrication equipment into high performance elastomeric articles such as garden hose or elastomeric footwear.

Accordingly, it is an object of our present instant invention to provide unique and novel compositions of a zinc neutralized sulfonated EPDM terpolymer being preferentially plasticized with zinc stearate thereby providing high performance elastomeric articles which can be formed on conventional plastic fabricating equipment, wherein the compositions can be optionally modified with fillers, extender oils or polyolefinic thermoplastics and mixtures thereof.

GENERAL DESCRIPTION

This present invention relates to unique and novel elastomeric compositions of a zinc neutralized sulfonated EPDM terpolymer, being preferentially plasticized with zinc stearate wherein the compositions exhibit not only a substantial improvement in flow properties but also unexpected improvements in physical properties thereby providing high performance elastomeric articles. Thus, by the addition of a high concentration of zinc stearate an essentially intractable zinc neutralized sulfonated EPDM terpolymer can be made to process readily in conventional extrusion or injection molding operations.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and unsaturation in a side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 80 wt. % ethylene and about 1 to about 10 wt. % of a diene monomer, the balance of the polymer being propylene. Preferably, the polymer contains about 45 to about 70 wt. % ethylene, e.g., 50 wt. % and about 2.6 to about 8.0 wt. % diene monomer, e.g., 5.0 wt. %. The diene monomer is preferably a non-conjugated diene.

Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.) a terpolymer having a Mooney viscosity (ML, 1 + 8, 212° F.) of about 40 and having an ethylene content of about 50 wt. % and a 5-ethylidene-2-norbornene content of about 5.0 wt. %. The $\overline{M}n$ of Vistalon 2504 is about 47,000, the $\overline{M}v$ is about 145,000 and the $\overline{M}w$ is about 174,000.

Another EPDM terpolymer Vistalon 2504-20 is derived from V-2504 (Exxon Chemical Co.) by a controlled extrusion process, wherein the resultant Mooney viscosity at 212° F. is about 20. The $\overline{M}n$ of Vistalon 2504-20 is about 26,000, the $\overline{M}v$ is about 90,000 and the $\overline{M}w$ is about 125,000.

Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$) of about 10,000 to about 200,000, more preferably of about 15,000 to about 100,000, most preferably of about 20,000 to about 60,000. The Mooney viscosity (ML, 1 + 8, 212° F.) of the EPDM terpolymer is about 5 to about 60, more preferably about 10 to about 50, and most preferably about 15 to about 40. The $\overline{M}v$ of the EPDM terpolymer is preferably below about 350,000 and more preferably below about 300,000. The $\overline{M}w$ of the EPDM terpolymer is preferably below about 500,000 and more preferably below about 350,000.

One method for carrying out the invention is to dissolve the elastomeric polymer in a non-reactive solvent such as a chlorinated aromatic hydrocarbon, an aromatic hydrocarbon, or an aliphatic hydrocarbon such as chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −10° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for the invention is an acyl sulfate selected from the group consisting essentially of benzoyl, acetyl, propionyl or butyryl sulfate. The acyl sulfate can be formed in situ in the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, with an aromatic hydroxyl compound, such as phenol, a cycloaliphatic alcohol such as a cyclohexanol or with water. The acid form of the sulfonated elastomeric polymer has about 10 to about 60 meq $SO_3H$ groups per 100 grams of sulfonated polymer, more preferably about 15 to about 50; and most preferably about 20 to about 40. The meq of $SO_3H$/100 grams of polymer is determined by both titration of the polymeric sulfonic acid and Dietert Sulfur analysis. In the titration of the sulfonic acid the polymer is dissolved in solvent consisting of 95 parts of toluene and 5 parts of methanol at a concentration level of 50 grams per liter of solvent. The acid form is titrated with ethanolic sodium hydroxide to an Alizarin Thymolphthalein endpoint.

The acid form of the sulfonated polymer is relatively gel free and hydrolytically stable. Gel is measured by stirring a given weight of polymer in a solvent comprised of 95 toluene/5 methanol at a concentration of 5 wt. %, for 24 hours, allowing the mixture to settle, withdrawing a weighed sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

Neutralization of the acid form of the sulfonated elastomeric polymer is done, for example, by the addition of a solution of zinc acetate to the acid form of the sulfonated elastomeric polymer dissolved in the mixture of the aliphatic alcohol and non-reactive solvent. The zinc acetate is dissolved in a binary solvent system consisting of water and/or an aliphatic alcohol.

Sufficient zinc acetate is added to the solution of the acid form of the elastomeric polymer to effect neutralization of the SO$_3$H groups. It is preferable to neutralize at least 95% of the acid groups, more preferably about 98%, most preferably 100%. ZnO can also be employed to effect the neutralization of the SO$_3$H groups.

The resultant zinc neutralized sulfonated EPDM terpolymer has a melt viscosity which is dependent upon the molecular weight of the base EPDM polymer, the level of sulfonation, and the associated cation. An EPDM with an original Mooney viscosity (ML, 1 + 8, 212° F.) of about 20, containing about 30 meq sulfonate/100 EPDM, and possessing a zinc cation possesses an apparent viscosity of about 22 × 10$^5$ poise at a shear rate of 0.73 sec$^{-1}$ at 200° C.

The physical properties of the unplasticized sulfonated and neutralized elastomers improve with increasing sulfonate content. Good development of physical properties usually starts to occur when about 20 meq sulfonate/100 polymer are present, and the physical properties obtained at 30 meq sulfonate/100 polymer and higher are preferred. However, even at these higher levels of sulfonate the unplasticized zinc neutralized sulfonated elastomers still possess relatively modest physical properties, and the melt viscosities are so high that mixing or processing these gums on conventional equipment is extremely difficult if not impossible.

U.S. Pat. No. 3,847,854 addressed itself to the problem of melt processability in metal sulfonate containing elastomers and a large number of materials are claimed as plasticizers that would give the ionomers lower melt viscosities at processing temperatures and thereby permit melt fabrication. However, many of the materials listed are relatively poor flow improvers. This patent also failed to recognize that the proper selection of the plasticizer is critical and that the selection of zinc stearate as compared to other metallic salts of fatty acids is critical for obtaining maximum physical and rheological properties. Further U.S. Pat. No. 3,847,854 teaches that the effective flow improvers have an adverse effect on physical properties and therefore cautions against the use of more than 6–7 weight % of a non-volatile plasticizer, which is directly contrary to the teachings of the instant application wherein a minimum of 8 parts per hundred by weight of zinc stearate is required.

The melt viscosities of some of the systems investigated herein were determined through the use of an Instron capillary rheometer. The melt viscosity measurements were made at a temperature of 200° C. and at various shear rates corresponding to crosshead speeds from 0.0005 in/min to 20 in/min. The apparent viscosity at 200° C. and at a shear rate of 0.73 sec$^{-1}$ (0.005 in/min) is employed as a characterization parameter of this invention. In addition to the capillary rheometer determinations measures of melt viscosity on many systems were obtained by determining the melt index at 190° C., generally at 250 psi. Materials possessing a melt index under these conditions of about 0.2g/10 min. or greater can be considered easily mixable with plasticizers, fillers, extender oils, and other additives in high intensity, high shear rate mixers. Materials can be considered to be extrudable or injection moldable when they possess a melt index under these conditions of about 5g/10 min and greater.

It has been found that among a large number of metallic salts of fatty acids that zinc stearate, when added at high concentration levels of at least 8 parts per hundred by weight of neutralized sulfonated EPDM terpolymer, resulted in the unique combination of markedly improved flow properties and at the same time an extraordinary improvement in physical properties for the sulfonated EPDM compositions. Contrary to the teachings of U.S. Pat. No. 3,847,854 zinc stearate at high concentrations exerts beneficial tensile property improvements at use temperature in addition to improvements in melt flow of the polymer. In fact, maximum physical property development generally occurs at zinc stearate concentrations of about 20 to about 50 parts by weight of zinc stearate.

The critical selection of zinc stearate as a preferential plasticizer at high concentration is borne out by the experimental data which clearly shows that other metallic salts of fatty acids such as barium stearate, calcium stearate or sodium stearate fail to provide for simultaneous vast improvements in both physical and rheological properties as seen with zinc stearate.

Additionally, the selection of the zinc cation to neutralize the sulfonated EPDM terpolymer is critical in order to obtain maximum physical and rheological properties.

In order to achieve an outstanding balance of good melt flow and enhanced physical properties, it is important to incorporate the zinc stearate into the zinc neutralized sulfonated elastomer at about 8 to about 60 parts by weight per hundred of the sulfonated polymer, more preferably at about 9 to about 40 and most preferably at about 10 to about 30.

The zinc stearate can be incorporated into the unplasticized gums in a number of ways. A convenient method is the addition of the zinc stearate to the cement of the sulfonated and neutralized polymer prior to its isolation during the manufacturing process. The resultant plasticized polymer still has sufficiently high viscosity and integrity that it can be easily and conveniently dried in a tumble dryer or fluid bed dryer with hot air at, for example, 100° C. Yet the plasticized polymer can be made to possess sufficiently low viscosity so that it may be dewatered and dried in a dewatering extruder.

Zinc stearate can also be added to the gums through the solution of already isolated and dried unplasticized gums and the addition of the zinc stearate to this solution. The resultant blend is isolated in the usual manner. Alternatively in cases where the unplasticized gums do not possess a very high viscosity, as for example a melt viscosity of about 10$^6$ poise at 200° C. and a shear rate of 0.73 sec$^{-1}$ it is relatively easy to flux the gum and the zinc stearate in high intensity high shear mixers such as Banbury mixers and Farrell continuous mixers.

The compositions of the present invention exhibit improved tensile properties at both room temperature and 70° C., wherein maximum improvement in tensile properties is achieved at a concentration level of above about 8 parts per hundred by weight of zinc stearate, more preferably above about 10 parts per hundred by weight. Thus, as the concentration of zinc stearate is increased past 8 parts per hundred, both the tensile strength at use temperatures and the melt processability at processing temperatures are substantially increasing. That tensile strength as well as melt flow would be improving as the concentration was increased was totally unexpected and contrary to the teachings of U.S. Pat. No. 3,847,854.

The detailed examples and figures clearly show that the employment of another metal stearate rather than zinc at concentration levels of above about 8 parts per hundred by weight of metal stearate results in compositions having either poorer rheological properties or inferior tensile properties as compared to the zinc stearate plasticized system. Additionally, it is clearly illustrated in the detailed examples and figures that the maximum balance of rheological and physical properties of the zinc neutralized sulfonated EPDM terpolymers is achieved at a concentration level of above at least about 8 parts per hundred by weight of zinc stearate. These results are quite surprising and completely unique and novel when viewed in light of the prior art, wherein the zinc stearate has been equivalent to all other metal stearates and the concentration of the metal stearate has been set at a useful concentration range of less than about 6–7 wt. %.

Additionally, the detailed examples and figures clearly show that the employment of a zinc stearate preferential plasticizer has markedly superior tensile properties as compared to those systems employing a mixed preferential plasticizer system of zinc stearate and the commonly used plasticizer stearic acid. It is critical that the stearic acid contained in a zinc stearate preferential plasticizer does not exceed 30%, more preferably 20%, and most preferably 10% in order to realize maximum physical properties.

DETAILED DESCRIPTION

The advantages of both the rheological and physical properties of the improved compositions of the present invention can be more readily appreciated by reference to the following examples, figures and tables.

EXAMPLE 1

A series of zinc sulfonate containing EPDM's varying in sulfonate content were prepared from a 20 Mooney (ML, 1 + 8, 212° F.) EPDM containing about 50 weight % ethylene, 45 weight % propylene and 5 weight % 5-ethylidene-2-norbornene. The base polymer was derived from the hot extruder breakdown of commercial Vistalon 2504 (Exxon Chemical Co.). To a solution of 800 g. of EPDM in 8000 ml. of hexane at room temperature was added acetic anhydride followed by concentrated sulfuric acid (acetic anhydride/$H_2SO_4$ = 1.62). After 30 minutes the sulfonation was terminated and the polymeric sulfonic acid simultaneously neutralized through the addition of a solution of zinc acetate (2.4 moles/mole $H_2SO_4$) in 640 ml. methanol and 24 ml. water. Irganox 1010 (0.8 g.) was added, and after 30 minutes the cement was steam stripped to isolate the product. The product was washed with water and pulverized in a Waring blender, and the wet crumb was dried on a rubber mill at about 210° F.

Tensile strengths on microdumbbells were determined at both room temperature and at 70° C. with an Instron TM table model instrument at the rate of 2 inches/minute. Melt index was determined at 190° C. and 250 psi (ASTM 1238-70, Condition J). Compression set was determined on molded samples according to ASTM-D-395, Method B. The melt viscosities of the samples were determined with an Instron capillary rheometer at 200° C. and at various shear rates corresponding to crosshead speeds of from 0.005 to 20 inches/minute. The apparent viscosity at 200° C. and at a shear rate of 0.73 sec$^{-1}$ (0.005 in/min) is useful as a characterization parameter. A measure of the melt elasticity of a given system can also be obtained from rheological measurements. A type of flow instability known as melt fracture can occur. This instability is shear rate dependent. The shear rate for the onset of melt fracture indicates the upper shear rate for processing a given material and is useful as a characterization parameter for materials employed in extrusion processing.

Table I details the compositions of the zinc sulfonate EPDM's, their tensile properties at room temperature and 70° C., their melt indexes, and rheological data.

These data show that zinc sulfonate EPDM's improve in tensile properties with increasing sulfonate content; however, this improvement occurs at the expense of higher melt viscosity and poorer processability. Even where modest physical properties are obtained most of these materials do not have sufficiently low melt viscosities to be considered suitably processable materials.

Over the range of sulfonate contents there was virtually no change in compression set of the zinc sulfonate EPDM's.

TABLE I

| EXAMPLE | 1-A | 1-B | 1-C | 1-D | 1-E | 1-F |
|---|---|---|---|---|---|---|
| Weight % Sulfur | 0.62 | 0.73 | 0.82 | 0.97 | 1.16 | 1.35 |
| Sulfonate Content, meq./100 Polymer | 19.4 | 22.8 | 25.6 | 30.3 | 36.3 | 42.2 |
| Weight % Zinc | 1.48 | 1.75 | 1.98 | 2.28 | 2.79 | 2.84 |
| Zinc, meq./100 Polymer | 45.3 | 53.5 | 60.6 | 69.7 | 85.3 | 86.9 |
| Melt Index (190° C., 250psi) g./10 minutes | 0.41 | 0.28 | 0.14 | 0.10 | 0.06 | 0.03 |
| Compression Set (25° C.), % | 36 | 41 | 39 | 37 | 40 | 39 |
| Room Temperature | | | | | | |
| 300% modulus, psi | 320 | 370 | 480 | 645 | 720 | 890 |
| Tesnile Strength, psi | 790 | 1140 | 1240 | 1520 | 1960 | 2300 |
| Elongation, % | 520 | 560 | 510 | 500 | 460 | 480 |
| 70° C. | | | | | | |
| 300% Modulus, psi | 140 | 170 | — | — | — | — |
| Tensile Strength, psi | 140 | 170 | 220 | 290 | 390 | 440 |
| Rheology at 200° C. | | | | | | |
| Apparent Viscosity, Poise × 10$^{-5}$ at 0.73 sec$^{-1}$ | 7.85 | 10.22 | 15.17 | 22.60 | 25.18 | 33.45 |

TABLE I-continued

| EXAMPLE | 1-A | 1-B | 1-C | 1-D | 1-E | 1-F |
|---|---|---|---|---|---|---|
| 7.3 sec$^{-1}$ | 2.20 | 2.74 | 3.74 | 5.21 | 5.70 | 7.20 |
| 14.5 sec$^{-1}$ | 1.45 | 1.79 | 2.37 | 3.32 | 3.60 | M.F.* |
| 29.1 sec$^{-1}$ | 0.95 | 1.14 | 1.47 | M.F.* | M.F.* | — |
| 73 sec$^{-1}$ | 0.52 | 0.61 | 0.79 | — | — | — |
| 146 sec$^{-1}$ | 0.32 | 0.37 | M.F.* | — | — | — |
| 291 sec$^{-1}$ | 0.19 | M.F.* | — | — | — | — |
| 728 sec$^{-1}$ | M.F.* | — | — | — | — | — |

16 * melt fracture

EXAMPLE 2

The zinc sulfonate EPDM's of Example 1 were dissolved in 95 toluene/5 methanol at a concentration of about 50 g./liter. To the cements were added various amounts of commercial (Mallinkrodt Chemical Co.) zinc stearate. After the zinc stearate had been dissolved or well dispersed the resultant cements were steam stripped, washed and dried as described in Example 1.

Table II lists the compositions, tensile properties, melt indexes, and compression set properties of the plasticized compositions.

Marked improvements in melt flow were obtained on the plasticized samples. These improvements in melt flow were not obtained at any sacrifice in tensile properties. In fact, a remarkable improvement in tensile properties was obtained at both room temperature and at 70° C. The maximum improvements in tensile properties were obtained at levels of zinc stearate in excess of about 10 parts/100 polymer. Improvements were obtained at every level of sulfonation.

Some increase in compression set was obtained with increasing zinc stearate concentration; however, the changes were relatively minor.

This example dramatically illustrates the effect of zinc stearate in simultaneously improving the flow properties and the tensile properties of zinc sulfonate EPDM's.

TABLE II

| Sulfonate Content meq/100 Polymer | Zinc Stearate 100 Polymer, Weight, g. | Melt Index 190° C., 250 psi), g./10 min. | % Comp. Set (30 min, 25° C.) | Room temperature | | | 70° C. | | |
|---|---|---|---|---|---|---|---|---|---|
| | | | | 300% Modulus, psi | Tensile Strength, psi | Elong. % | 300% Modulus, psi | Tensile Strength psi | Elong % |
| 19.2 | 0 | 0.41 | 36 | 320 | 790 | 520 | 140 | 140 | 300 |
| | 3.2 | 0.55 | 47 | 420 | 1350 | 560 | 205 | 220 | 350 |
| | 6.3 | 1.4 | 44 | 450 | 1550 | 580 | 210 | 290 | 450 |
| | 12.6 | 3.4 | 43 | 505 | 2190 | 610 | 275 | 360 | 450 |
| | 18.9 | 5.6 | 45 | 560 | 2640 | 640 | 310 | 450 | 450 |
| | 25.2 | 11.0 | 46 | 505 | 2120 | 610 | 270 | 430 | 530 |
| | 39.9 | 24.9 | 45 | 560 | 2450 | 660 | 270 | 460 | 620 |
| 22.9 | 0 | 0.28 | 41 | 370 | 1140 | 560 | 170 | 170 | 320 |
| | 3.8 | 0.40 | 44 | 460 | 1740 | 590 | 260 | 310 | 360 |
| | 7.7 | 1.1 | 45 | 570 | 1935 | 580 | 350 | 480 | 440 |
| | 15.4 | 3.0 | 45 | 570 | 2490 | 590 | 310 | 520 | 510 |
| | 23.1 | 5.5 | 46 | 625 | 2670 | 605 | 370 | 580 | 510 |
| | 30.8 | 9.7 | 47 | 640 | 3350 | 650 | 290 | 560 | 590 |
| | 39.8 | 17.3 | 48 | 665 | 3260 | 600 | 280 | 460 | 530 |
| 25.6 | 0 | 0.14 | 39 | 480 | 1240 | 510 | — | 220 | 290 |
| | 4.5 | 0.23 | 48 | 640 | 2300 | 550 | 340 | 390 | 360 |
| | 9.1 | 0.68 | 43 | 800 | 2700 | 520 | 360 | 560 | 450 |
| | 18.1 | 2.2 | 47 | 930 | 3510 | 500 | 460 | 770 | 490 |
| | 27.2 | 4.8 | 48 | 970 | 3760 | 580 | 420 | 830 | 560 |
| | 36.3 | 9.2 | 42 | 900 | 3920 | 610 | 405 | 770 | 560 |
| | 39.8 | 10.9 | 40 | 930 | 3670 | 590 | 450 | 1040 | 630 |
| 30.4 | 0 | 0.10 | 37 | 645 | 1520 | 500 | — | 290 | 290 |
| | 5.2 | 0.13 | 37 | 1040 | 2170 | 440 | 410 | 420 | 300 |
| | 10.4 | 0.46 | 34 | 1220 | 3480 | 500 | 450 | 610 | 400 |
| | 20.8 | 1.7 | 36 | 1545 | 4580 | 510 | 490 | 670 | 400 |
| | 31.2 | 4.0 | 39 | 1530 | 4360 | 510 | 550 | 930 | 480 |
| | 41.6 | 4.2 | 45 | 1430 | 4400 | 540 | 460 | 1210 | 640 |
| 36.3 | 0 | 0.06 | 40 | 720 | 1960 | 460 | — | 390 | 310 |
| | 5.9 | 0.07 | 36 | 1140 | 2630 | 450 | 500 | 585 | 350 |
| | 11.7 | 0.28 | 35 | 1305 | 3800 | 490 | 460 | 690 | 420 |
| | 23.5 | 1.3 | 41 | 1585 | 5450 | 510 | 530 | 1060 | 520 |
| | 35.2 | 3.3 | 44 | 1400 | 3660 | 510 | 500 | 1150 | 530 |
| | 46.9 | 8.2 | 49 | 1190 | 3940 | 540 | 445 | 870 | 520 |
| 42.2 | 0 | 0.03 | 39 | 890 | 2300 | 480 | — | 440 | 310 |
| | 6.5 | 0.05 | 38 | 990 | 2950 | 500 | 440 | 580 | 390 |
| | 13.1 | 0.23 | 40 | 1185 | 4125 | 510 | 460 | 850 | 510 |
| | 26.1 | 1.1 | 42 | 1400 | 5110 | 515 | 520 | 910 | 490 |
| | 39.1 | 3.5 | 51 | 1450 | 5330 | 550 | 505 | 1250 | 620 |
| | 52.2 | 8.7 | 52 | 1390 | 5390 | 580 | 520 | 1670 | 700 |

EXAMPLE 3

To a cement of 800 g. of the EPDM described in Example 1 in 8000 ml. hexane was added with agitation 45.9 ml. of acetic anhydride followed by 16.8 ml. of concentrated sulfuric acid. After 30 minutes the sulfonation was terminated through the addition of 1200 ml. isopropanol. Antioxidant 2246 (4.0 g.) was added, and the cement was steam stripped. The polymeric sulfonic acid was washed with water in a Waring blender, and the wet crumb was dewatered and dried on a warm (100°-200° F.) rubber mill. Titration of the product in toluene/methanol solution with ethanolic sodium hydroxide showed it to contain about 30.7 meq. of acid/100 polymer. Sulfur content was 0.945 weight % by Dietert analysis which corresponds to 29.5 meq. sulfonic acid/100 polymer.

A series of metal sulfonate salts was prepared from the free polymeric acid as follows: 100 g. of the dewatered polymer was dissolved in 1000 ml. hexane and 150 ml. isopropanol. Each of the following metal acetates was dissolved in water at a level of 90 meq./25 ml. water: $Hg(OOCCH_3)_2$, $Ca(OOCCH_3)_2.2\ H_2O$, $NaOOCCH_3.3\ H_2O$, $LiOOCCH_3.2\ H_2O$, $Mg(OOCCH_3)_2.4\ H_2O$, $Zn(OOCCH_3)_2.2\ H_2O$, $Co(OOCCH_3)_2.4\ H_2O$, and $Ba(OOCCH_3)_2$. The mercuric acetate-water mixture was warmed to aid solution. The aqueous solution of 90 meq. metal acetate was added to the solution of the free polymeric sulfonic acid and, after sufficient agitation, the neutralized products were isolated by steam stripping, washing with water in a Waring blender, and drying on a rubber mill at greater than 210° F.

The flow and tensile properties of these various metal sulfonate EPDM's are given in Table III. The melt viscosities were determined with an Instron table model capillary rheometer. Attempts were made to obtain melt indexes at 190° C. and 476 psi. The mercuric sulfonate did not form a coherent strand during testing in the capillary rheometer. The viscosities of all other metal sulfonates were uniformly high with the exception of the zinc salt. None of the metal sulfonates flowed during melt index measurement except for the zinc salt. These results demonstrate the effect that cation type has on the rheological properties of metal sulfonate EPDM's. They also show that the zinc salt stands out above all the others listed in providing for a low melt viscosity.

The physical properties in all cases were not very good although zinc gave the best tensile properties at room temperature and among the best at 70° C.

sulfur (31.9 meq. sulfonate/100 polymer) and 1.57 weight % zinc (48.0 meq./100 polymer).

The dried polymer was dissolved in 95 toluene/5 methanol at a concentration of 50 g./liter, and stearic acid and zinc stearate were added at levels of 30, 60 and 90 meq./100 polymer. After isolation by steam stripping and drying the products were tested. Tensile properties at room temperature and 70° C. and melt indexes are given in Table IV.

Both stearic acid and zinc stearate are excellent plasticizers for zinc sulfonate EPDM. Melt viscosity is sharply reduced with increasing concentration of plasticizer. However, a remarkable difference in physical properties exists between stearic acid plasticized systems and those plasticized with zinc stearate. This is especially dramatic at 70° C. where the stearic acid plasticized systems virtually lost all strength while the zinc stearate plasticized systems improve in strength with increasing concentration.

TABLE IV

| Plasticizer Added, meq/100 EPDM | | Melt Index (190° C., 250 psi), g./10 min. | Room Temperature | | | 70° C. | | |
|---|---|---|---|---|---|---|---|---|
| Stearic Acid | Zinc Stearate | | 300% Modulus psi | Tensile Strength psi | Elong. % | 300% Modulus psi | Tensile Strength psi | Elong. % |
| 0 | 0 | 0 | 790 | 1365 | 440 | — | 250 | 150 |
| 30 | 0 | 0.30 | 520 | 1360 | 560 | 90 | 95 | 750 |
| 60 | 0 | 1.1 | 490 | 1670 | 590 | 70 | 60 | >800 |
| 90 | 0 | 3.0 | 460 | 1495 | 590 | 20 | 10 | >800 |
| 0 | 30 | 0.35 | 1180 | 3020 | 480 | 420 | 500 | 360 |
| 0 | 60 | 1.5 | 1360 | 3640 | 500 | 450 | 525 | 340 |
| 0 | 90 | 3.8 | 1260 | 3230 | 505 | 410 | 840 | 565 |

EXAMPLE 5

The preparation of zinc sulfonate EPDM described in Example 4 was repeated. The product contained 1.03 wt. % sulfur (32.2 meq. sulfonate/100 polymer) and 1.57 wt. % zinc (48.0 meq./100 polymer).

According to the procedure of Example 4 zinc stearate, barium stearate, and magnesium stearate were added to the zinc sulfonate EPDM at levels of 30, 60, and 90 meq./100 polymer. The tensile properties were determined at room temperature and 70° C., and melt indexes were obtained at 190° C. at both 250 psi and 476 psi. Data are detailed in Table V.

At all levels examined neither the barium stearate nor the magnesium stearate showed any measurable improvement in melt viscosity. On the other hand zinc stearate gave substantial improvements in melt flow. Yet the tensile properties of the zinc stearate plasticized gums were better at both room temperature and 70° C. than those of the barium stearate and magnesium stearate plasticized gums.

TABLE III

| Metal | Viscosity Poise × $10^{-5}$ (0.88 $sec^{-1}$) | Melt Fracture at Shear Rate, $sec^{-1}$ | Melt Index (190° C., 476 psi) g./10 min. | Room Temperature | | | 70° C. | | |
|---|---|---|---|---|---|---|---|---|---|
| | | | | 300% Modulus psi | Tensile Strength psi | Elong. % | 300% Modulus psi | Tensile Strength psi | Elong. % |
| Hg | — | Disintegrated | 0 | — | — | — | — | — | — |
| Mg | 55.0 | ≦0.88 | 0 | — | 320 | 70 | — | 150 | 40 |
| Ca | 53.2 | ≦0.88 | 0 | — | 410 | 90 | — | 170 | 40 |
| Co | 52.3 | ≦0.88 | 0 | — | 1180 | 290 | — | 450 | 160 |
| Li | 51.5 | ≦0.88 | 0 | 710 | 760 | 320 | — | 250 | 130 |
| Ba | 50.8 | ≦0.88 | 0 | — | 340 | 70 | — | 150 | 30 |
| Na | 50.6 | ≦0.88 | 0 | 870 | 960 | 350 | — | 270 | 110 |
| Zn | 12.0 | 147 | 0.75 | 1010 | 1480 | 400 | 210 | 270 | 450 |

EXAMPLE 4

Six hundred grams of the EPDM described in Example 1 was sulfonated according to the procedure of Example 1-D. Sulfonation was terminated with 900 ml. Isopropanol, and the polymeric sulfonic acid was neutralized through the addition of 540 meq. of zinc acetate dissolved in 150 ml. water. The product was isolated as described in Example 1. It contained 1.02 weight %

TABLE V

| Plasticizer | Meq./ 100 EPDM | Melt Index (190° C.) g./10 min 250 psi | Melt Index (190° C.) g./10 min 476 psi | Room Temperature 300% Modulus psi | Room Temperature Tensile Strength psi | Room Temperature Elong. % | 70° C. 300% Modulus psi | 70° C. Tensile Strength psi | 70° C. Elong. % |
|---|---|---|---|---|---|---|---|---|---|
| Barium Stearate | 30 | 0 | 0.09 | 1430 | 1630 | 330 | — | 425 | 180 |
| Barium Stearate | 60 | 0 | 0.06 | 1260 | 1910 | 380 | 765 | 840 | 340 |
| Barium Stearate | 90 | 0 | 0.04 | 1330 | 1920 | 410 | 570 | 960 | 370 |
| Magnesium Stearate | 30 | 0 | 0.06 | — | 700 | 170 | — | 280 | 80 |
| Magnesium Stearate | 60 | 0 | 0.03 | 1270 | 2500 | 460 | 470 | 560 | 360 |
| Magnesium Stearate | 90 | 0 | 0.05 | 1170 | 2570 | 490 | 560 | 690 | 370 |
| Zinc Stearate | 30 | 0.20 | 0.72 | 1190 | 2570 | 470 | 410 | 660 | 470 |
| Zinc Stearate | 60 | 0.88 | 3.4 | 1375 | 3130 | 470 | 370 | 940 | 640 |
| Zinc Stearate | 90 | 2.1 | 8.2 | 1425 | 3040 | 460 | 370 | 1150 | 750 |

EXAMPLE 6

To the zinc sulfonate EPDM of Example 5 was added 90 meq. each of ammonium stearate, sodium stearate, lithium stearate, and calcium stearate according to the procedure of Example 4. Tensile properties and melt index data are given in Table VI.

Ammonium stearate results in a marked improvement in flow properties but provides no improvement in tensile properties. The sodium stearate, lithium stearate, and calcium stearate do not significantly affect melt viscosity and at the same time show no beneficial effect upon tensile properties. Of all the stearates listed the zinc stearate is the only one which gives simultaneous large improvements in both melt flow and tensile properties.

TABLE VI

| Example | Stearate Plasticizer | Melt Index (190° C.) g./10 min. 250 psi | Melt Index (190° C.) g./10 min. 476 psi | Room Temperature 300% Modulus psi | Room Temperature Tensile Strength psi | Room Temperature Elong. % | 70° C. 300% Modulus psi | 70° C. Tensile Strength psi | 70° C. Elong. % |
|---|---|---|---|---|---|---|---|---|---|
| 6 | NH$_4$ | 2.3 | 10.5 | 515 | 2100 | 570 | — | 70 | >800 |
| 6 | Na | 0.04 | 0.14 | 825 | 1460 | 480 | — | 360 | 200 |
| 6 | Li | 0.07 | 0.27 | 840 | 1635 | 510 | 250 | 275 | 360 |
| 6 | Ca | 0 | 0.37 | 580 | 1220 | 530 | 380 | 510 | 410 |
| 5 | Ba | 0 | 0.04 | 1330 | 1920 | 410 | 570 | 960 | 370 |
| 5 | Mg | 0 | 0.05 | 1170 | 2570 | 490 | 560 | 690 | 370 |
| 5 | Zn | 2.1 | 8.2 | 1425 | 3040 | 460 | 370 | 1150 | 750 |

EXAMPLE 7

Commercial zinc stearate contains some zinc oxide. In order to rule out any effects of zinc oxide upon properties zinc stearate was synthesized from sodium stearate and zinc chloride. The product analyzed for 10.39 weight % zinc (theoretical = 10.34 weight %). The starting stearic acid for this synthesis was equivalent to USP grade stearic acid which is essentially 70–75% stearic acid and about 25–30% palmitic acid.

An EPDM having a Mooney viscosity (ML, 1 + 8, 212° F.) of 20 and containing about 56 weight % ethylene and about 4.4 weight % 5-ethylidene-2-norbornene was dissolved in hexane at a concentration of 100 g./liter hexane under reflux conditions. The cement was cooled to room temperature and acetic anhydride was added at a concentration of 76.6 mmoles/100 EPDM. Concentrated sulfuric acid was slowly added to a level of 33.3 mmoles/100 EPDM. After 30 minutes of agitation the sulfonation was terminated and neutralization simultaneously effected through the addition of zinc stearate at a level of 70 meq./100 EPDM in 80 ml. methanol and 3 ml. water. The cement was steam stripped, and the resultant wet crumb was dried in a fluid air dryer at about 100° C. for about 4 hours. The water content of the dried crumb was about 0.5 weight %. The sulfonate content, based on sulfur analysis, was about 30 meq./100 EPDM.

The zinc sulfonate EPDM was dissolved in 95 toluene/5 methanol at a concentration of about 100 g./liter. Synthesized zinc stearate was added at various levels (cf. Table VII), and when solution or homogeneous dispersion had been achieved the plasticized products were steam stripped and isolated as described in Example 4. The tensile properties at room temperature and 70° C. were determined as well as melt index. Data are given in Table VII.

Figure 1:
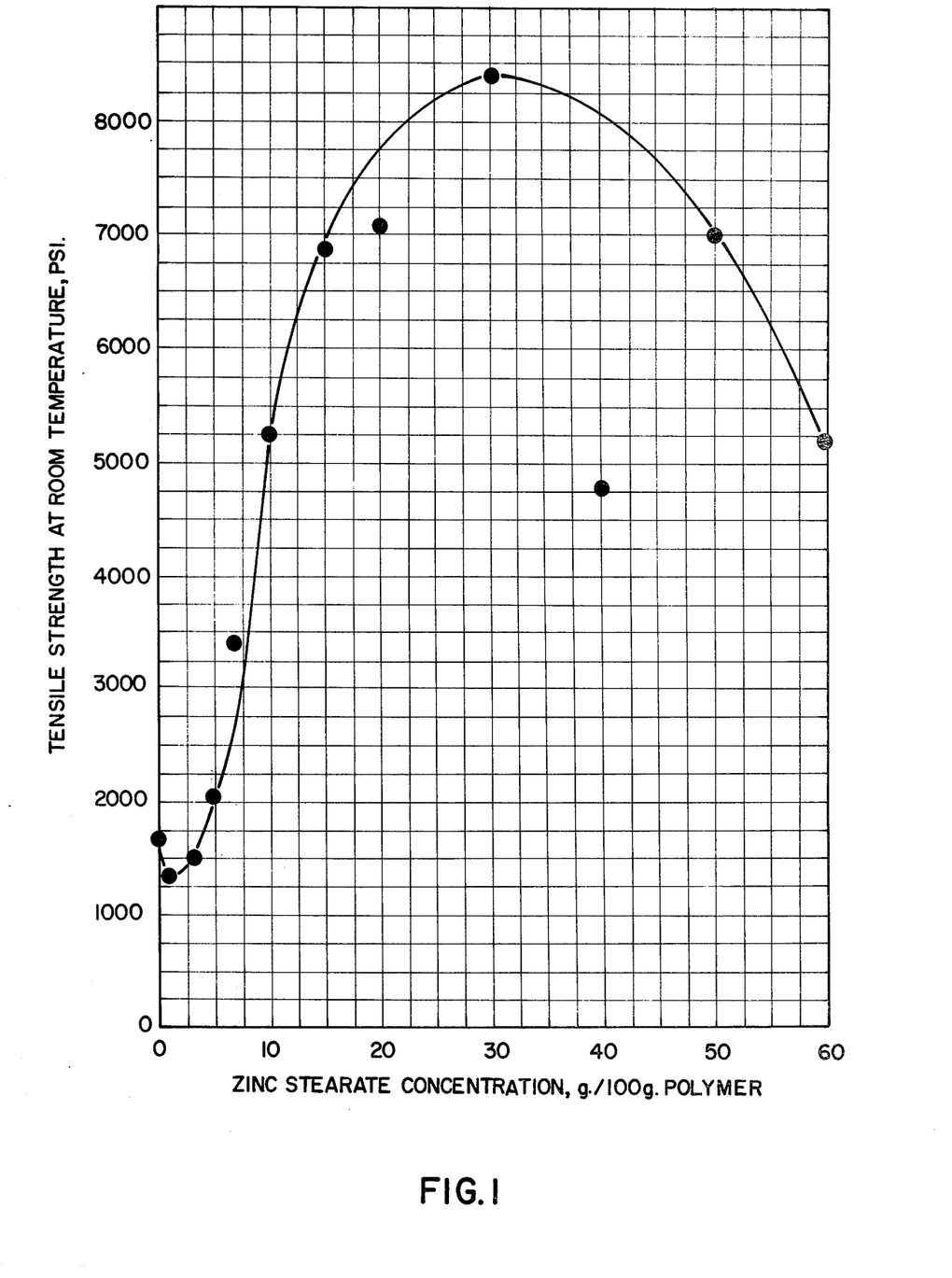
FIG. 1 illustrates the effect of zinc stearate plasticizer concentration on room temperature tensile properties of zinc sulfonate EPDM.
Figure 2:
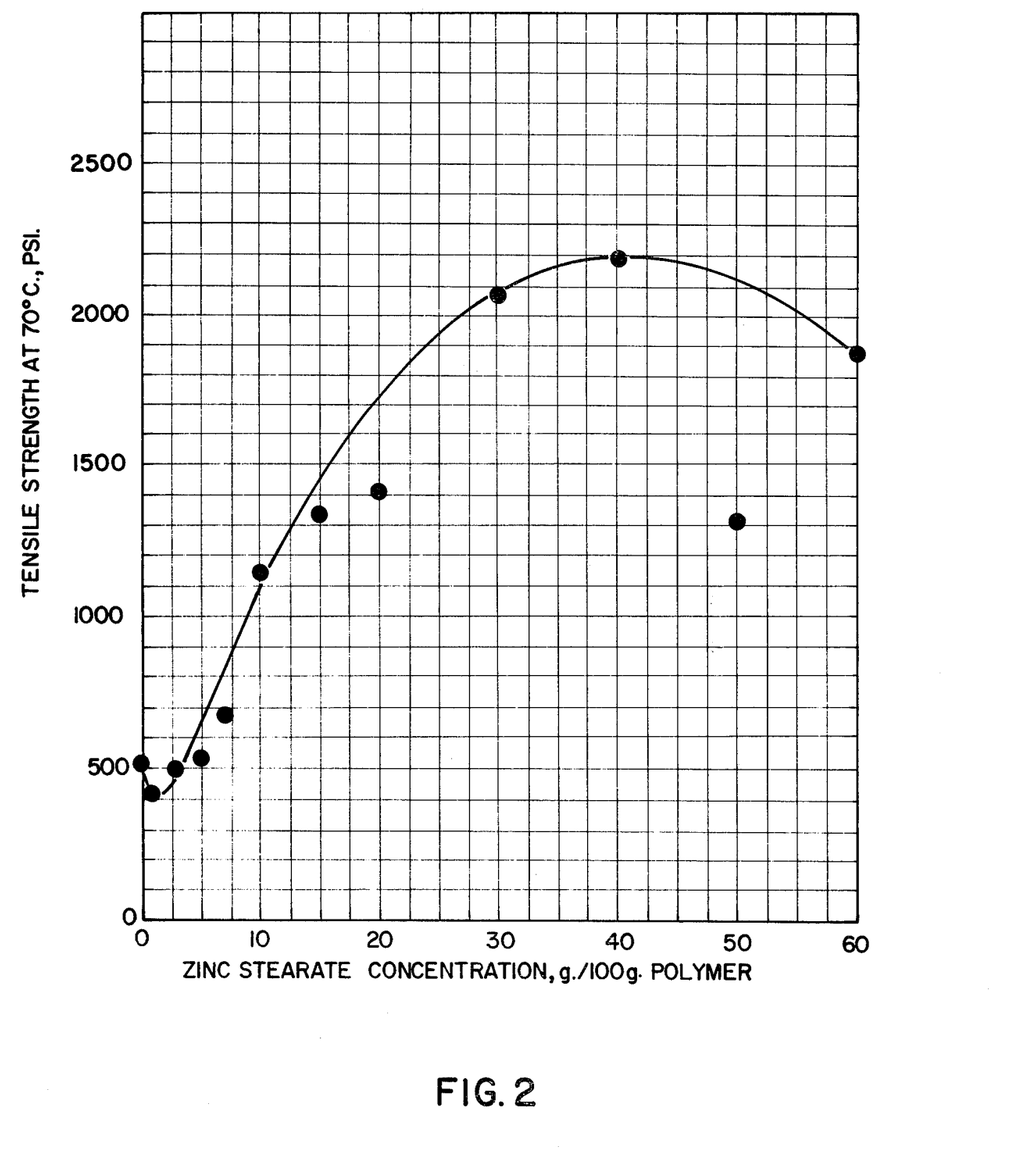
FIG. 2 illustrates the effect of zinc stearate concentration on 70° C. tensile properties of zinc sulfonate EPDM.
Figure 3:
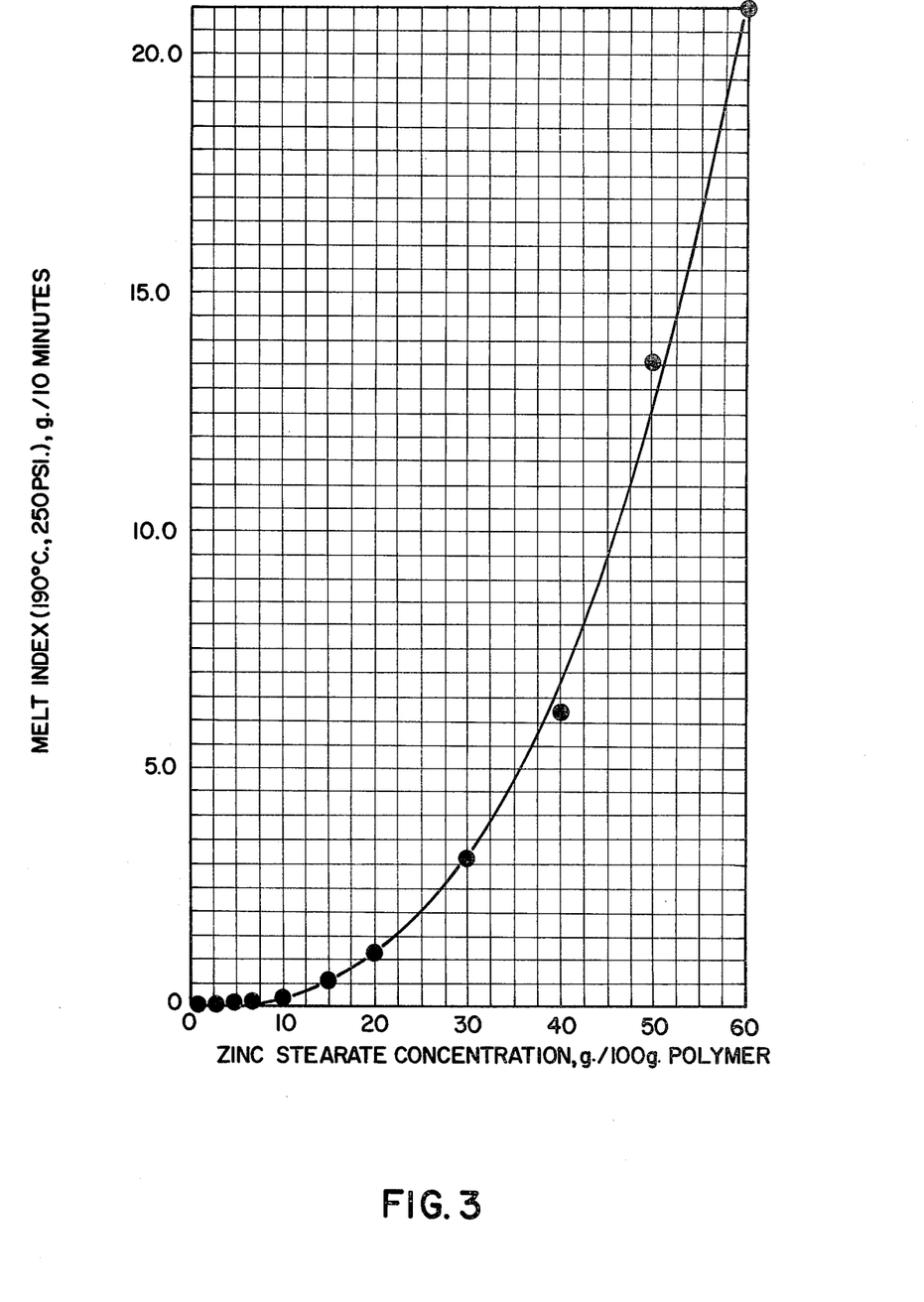
FIG. 3 illustrates the effect of zinc stearate concentration on melt index of zinc sulfonate EPDM.

As in earlier examples the flow and tensile properties were improved when zinc stearate was added. However, much better physical properties were obtained through the use of the EPDM base polymer of this example. These effects are illustrated in FIGS. 1–3. The addition of 5 parts of zinc stearate improved the tensile strength only slightly. (FIG. 1) In the region from 5 parts to 10 parts of zinc stearate room temperature tensile strength increased from about 2000 psi to over 5000 psi. A maximum in tensile strength (about 8400 psi) was achieved at about 30 parts of zinc stearate. Between the levels of 10 parts and 60 parts of zinc stearate the room temperature tensile strength at all times remained above 5000 psi.

The behavior of the 70° C. tensile strength is quite similar (FIG. 2). Significant improvement in tensile strength was not achieved until about 7 parts of zinc stearate was present. Substantial improvement was achieved at 10 parts of zinc stearate with the maximum in tensile properties at between about 30 to about 60 parts of zinc stearate. Even at 60 parts of zinc stearate a good tensile strength of 1900 psi was obtained.

The effect of zinc stearate on melt index, or melt viscosity, is equally dramatic (FIG. 3). Good flow was not achieved until about 10 parts of zinc stearate were contained in the gum. The most substantial improvement in melt index was achieved at zinc stearate concentrations greater than about 10 parts.

Thus it is possible to convert a zinc sulfonate gum which is relatively intractible and poorly processable and possessing relatively modest tensile properties to a zinc plasticized gum that has low viscosity and is easily processable and that possesses outstanding tensile properties not only at room temperature but also at 70° C.

Figure 6:
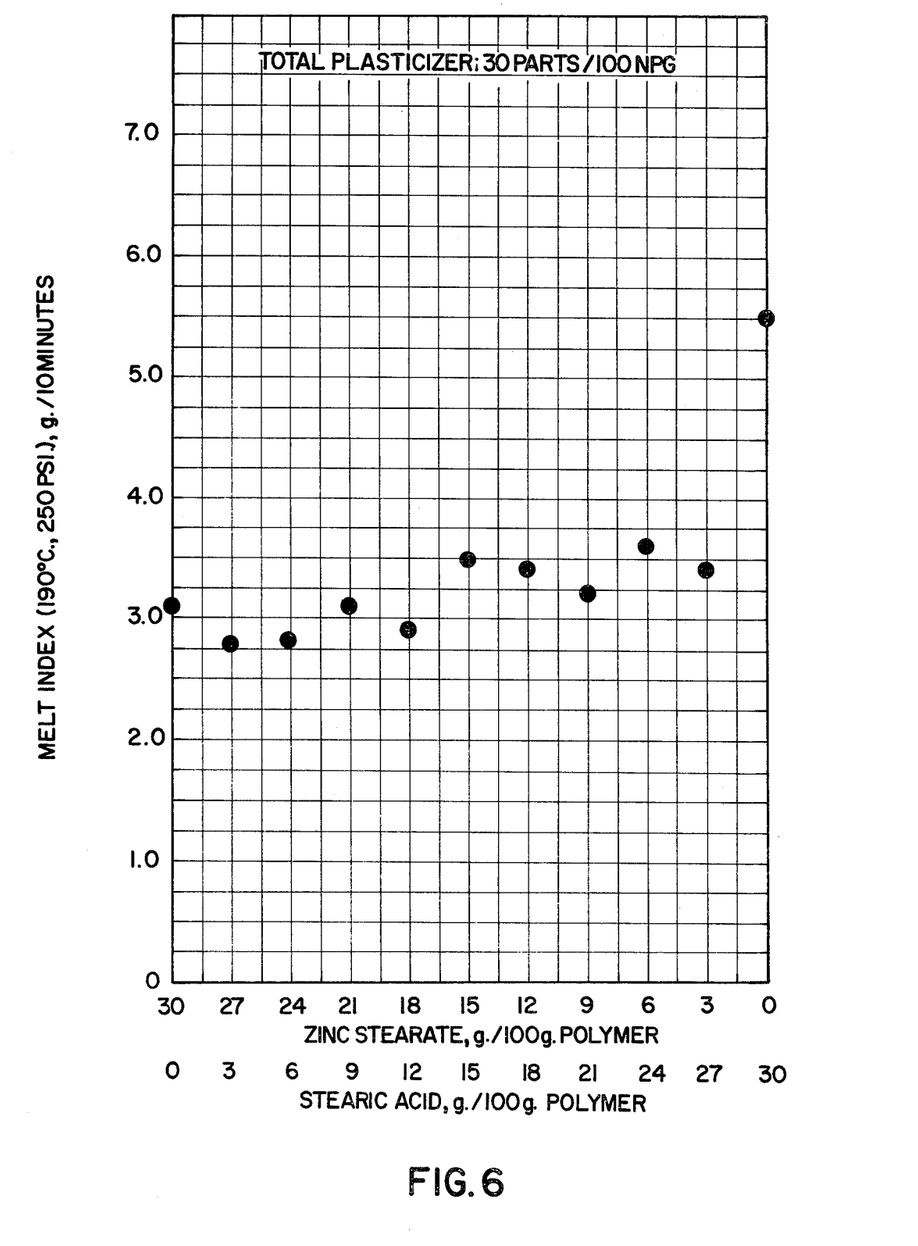
FIG. 6 illustrates the effect of stearic acid on melt index of a zinc stearate/stearic acid plasticized zinc sulfonate EPDM.

The effect of stearic acid upon melt index is relatively minor (FIG. 6). Melt index increased slightly as the proportion of stearic acid increased. Little is gained in melt processability through the replacement of zinc stearate with stearic acid.

TABLE VII
EFFECT OF ZINC STEARATE ON MELT INDEX AND TENSILE PROPERTIES OF ZINC SULFONATE EPDM

| Zinc Stearate Parts/100 Polymer | Room Temperature | | | 70° C. | | | Melt Index (190° C., 250 psi) g/10 min. |
|---|---|---|---|---|---|---|---|
| | 300% Modulus psi | Tensile Strength psi | Elong. % | 300% Modulus psi | Tensile Strength psi | Elong. % | |
| 0 | 1150 | 1660 | 390 | — | 510 | 190 | No Flow |
| 1 | 1050 | 1320 | 355 | — | 410 | 150 | No Flow |
| 3 | 1060 | 1500 | 370 | — | 500 | 270 | No Flow |
| 5 | 925 | 2050 | 430 | 360 | 530 | 400 | 0.02 |
| 7 | 880 | 3390 | 540 | 460 | 680 | 430 | 0.05 |
| 10 | 940 | 5250 | 520 | 550 | 1140 | 510 | 0.17 |
| 15 | 1090 | 6870 | 570 | 550 | 1340 | 610 | 0.53 |
| 20 | 1050 | 7075 | 585 | 530 | 1410 | 620 | 1.11 |
| 30 | 1030 | 8410 | 620 | 470 | 2070 | 810 | 3.06 |
| 40 | 950 | 4780 | 600 | 470 | 2190 | 790 | 6.15 |
| 50 | 1025 | 7000 | 610 | 520 | 1320 | 600 | 13.61 |
| 60 | 740 | 5080 | 510 | 550 | 1880 | 730 | 21.05 |

EXAMPLE 8

TABLE VIII
EFFECT OF REPLACEMENT OF ZINC STEARATE WITH STEARIC ACID ON THE MELT INDEX AND TENSILE PROPERTIES OF ZINC SULFONATE EPDM

| Zinc Stearate Parts/100 Polymer | Stearic Acid Parts/100 Polymer | Room Temperature | | | 70° C. | | | Melt Index (190° C, 250 psi) g/10 min. |
|---|---|---|---|---|---|---|---|---|
| | | 300% Modulus psi | Tensile Strength psi | Elong. % | 300% Modulus psi | Tensile Strength psi | Elong. % | |
| 27 | 3 | 880 | 6200 | 600 | 580 | 1980 | 720 | 2.79 |
| 24 | 6 | 690 | 6030 | 640 | 330 | 920 | 690 | 2.76 |
| 21 | 9 | 370 | 3170 | 650 | 150 | 230 | 770 | 3.07 |
| 18 | 12 | 340 | 1940 | 670 | 120 | 120 | 820 | 2.86 |
| 15 | 15 | 340 | 1490 | 645 | 80 | 50 | 760 | 3.52 |
| 12 | 18 | 320 | 1775 | 720 | 40 | 40 | 350 | 3.36 |
| 9 | 21 | 360 | 2240 | 730 | 50 | 10 | 780 | 3.24 |
| 6 | 24 | 360 | 1990 | 750 | — | 20 | 280 | 3.63 |
| 3 | 27 | 340 | 1720 | 740 | 20 | 20 | 340 | 3.38 |
| 0 | 30 | 420 | 1650 | 690 | — | 10 | 270 | 5.46 |

Figure 4:
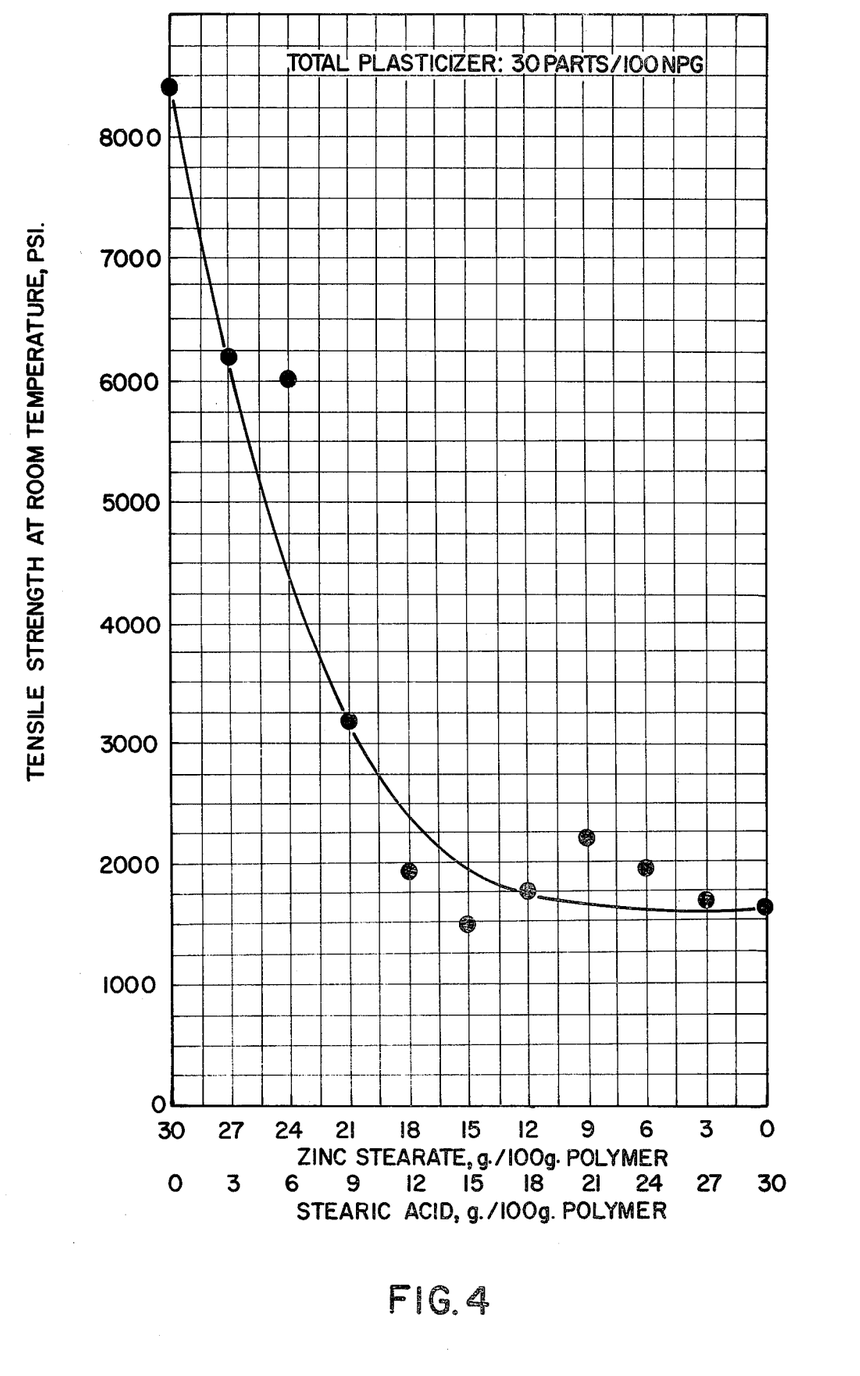
FIG. 4 illustrates the effect of stearic acid on the room temperature tensile properties of a zinc stearate/stearic acid plasticized zinc sulfonate EPDM.

Plasticizer was added to the zinc sulfonate EPDM of Example 7 at a level of 30 total parts/100 polymer; however, the plasticizer was a mixture of zinc stearate and stearic acid. These plasticizers are described in Example 7. The effects of mixtures of stearic acid and zinc stearate on tensile properties and melt index are detailed in Table VIII and are illustrated in FIGS. 4–6.

A substantial reduction in room temperature tensile strength was obtained when only 10% of the zinc stearate was replaced with stearic acid (FIG. 4); however, the tensile strength was still a substantial 6000 psi. Increasing the proportion of stearic acid resulted in a sharp drop in tensile strength. After 40% of the zinc stearate had been replaced with stearic acid and tensile strength was at its lowest and did not change as the proportion of stearic acid increased to 100%.

Figure 5:
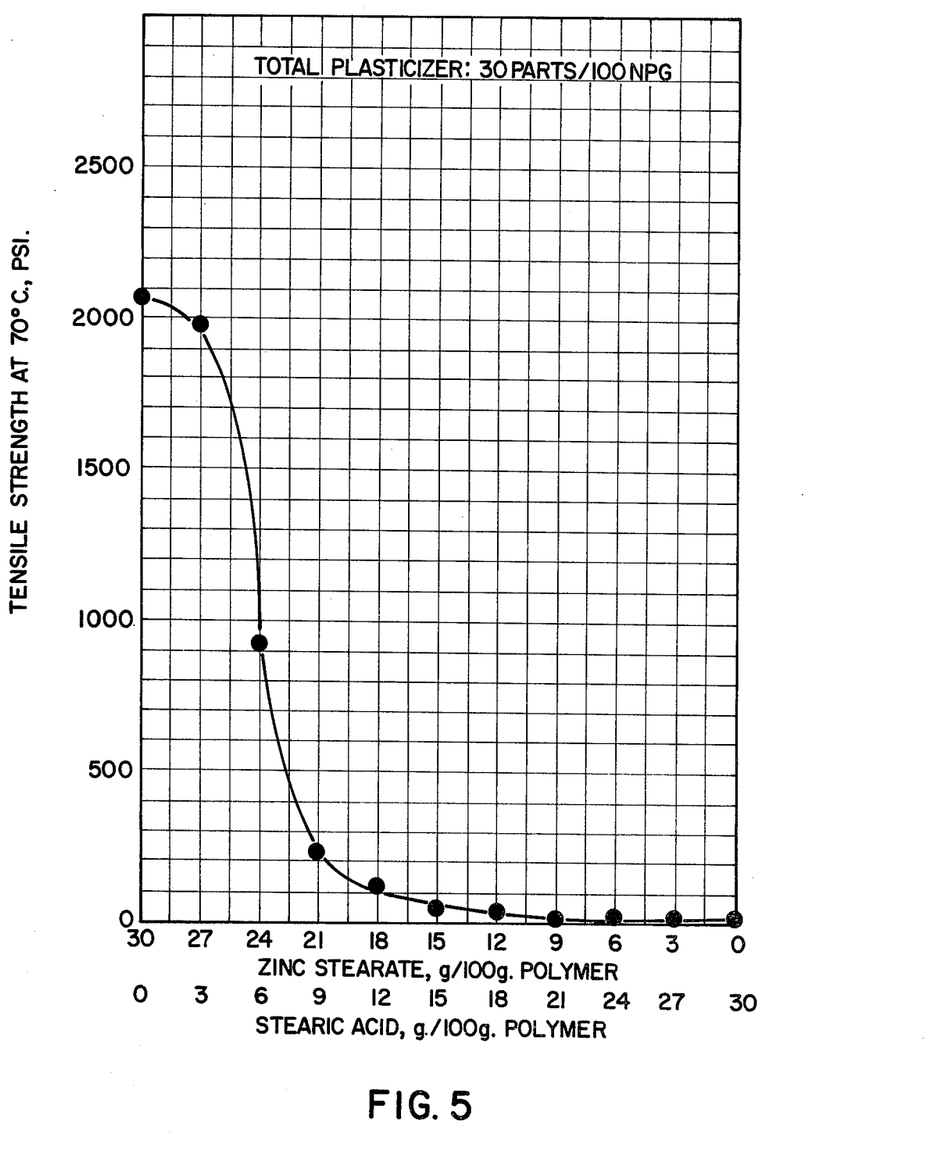
FIG. 5 illustrates the effect of stearic acid on 70° C. tensile properties of a zinc stearate/stearic acid plasticized zinc sulfonate EPDM.

Similar behavior was obtained with the 70° C. tensile strength (FIG. 5). After 40% or more of the zinc stearate had been replaced with stearic acid the 70° C. tensile strength was only about 100 psi and below. This is in dramatic contrast to the tensile strength of about 2100 psi for the 100% zinc stearate plasticized gum.

EXAMPLE 9

The 20 Mooney EPDM of Example 1 was sulfonated according to the procedure of Example 1-D. Neutralization was effected with 60 meq. zinc acetate/100 EPDM. The resultant polymer contained about 32 meq. sulfonate/100 polymer. Polymer isolation and drying was according to earlier described procedures.

Dried crum was dry mixed with zinc stearate at a level of about 16 parts zinc stearate/100 polymer. The dry blend was added to a Brabender plasticorder having a 60 cc. mixing head with Banbury mixers. The blend was mixed at 160° C. and 50 rpm. The blend rapidly fused into a coherent melt and excellent dispersion of the additive was obtained. After six minutes the hot melt was sheeted out on a two-roll mill.

The tensile strength at room temperature and 70° C. and the melt index of the blend were determined. Data are given in Table IX.

Excellent physical properties were obtained, and a marked improvement in melt flow resulted. This example demonstrates that zinc stearate can be uniformly blended into relatively intractible zinc sulfonate EPDM through dry blending and hot melt mixing.

TABLE IX

| Zinc Stearate Concentration meq/100 Polymer | Melt Flow Rate[1] (g/10 min) | Tensile Properties[2] | | | | | |
|---|---|---|---|---|---|---|---|
| | | 25° C. | | | 70° C. | | |
| | | Tensile Strength psi | Elong. % | Initial Modulus[3] psi | Tensile Strength psi | Elong. % | Initial Modulus psi |
| 60 | 1.2 | 3080 | 495 | 985 | 720 | 530 | 670 |

TABLE IX-continued

| Zinc Stearate Concentration meq/100 Polymer | Melt Flow Rate[1] (g/10 min) | Tensile Properties[2] |  |  |  |  |  |
|---|---|---|---|---|---|---|---|
| | | 25° C. | | | 70° C. | | |
| | | Tensile Strength psi | Elong. % | Initial Modulus[3] psi | Tensile Strength psi | Elong. % | Initial Modulus psi |
| 0 | 0.007 | 650 | 250 | 385 | 305 | 310 | 310 |

[1]ASTM 1238-70, Standard Capillary, 190° C., 250 psi.
[2]Microdumbell, about 22 mils thick, 0.1 inch wide, 0.5 inch long straight test region. Pulled at 2 inches/minute.
[3]Modulus determined from initial steepest slope of the stress-strain curve.

EXAMPLE 10

The tensile properties of the zinc stearate plasticized gum prepared in Example 9 were measured as a function of temperature from room temperature up to 158° C. The results are shown in Table X. For comparison, data at room temperature and 70° C. for the nonplasticized gum, and for a stearic acid plasticized gum at the same plasticizer level (60 meq./100 polymer) are also shown. It is clear from this data that the zinc stearate plasticized material retains a significant tensile strength, over 175 psi, up to over 100° C. and, at room temperature and 70° C., the zinc stearate plasticized material has tensile strengths far superior to that of the nonplasticized gum and the stearic acid plasticized gum.

TABLE X

| Additive | Temp. (° C) | Tensile Properties[2] | | |
|---|---|---|---|---|
| | | Tensile Strength psi | Elong. % | Initial Modulus[3] psi |
| Zinc Stearate U.S.P. | 25 | 3583 | 680 | 1540 |
| " | 37 | 2390 | 610 | 1450 |
| " | 47 | 1580 | 535 | 1360 |
| " | 58 | 1010 | 540 | 1115 |
| " | 69 | 760 | 620 | 905 |
| " | 80 | 445 | 590 | 645 |
| " | 92 | 280 | 680 | 430 |
| " | 104 | 175 | 1035 | 280 |
| " | 115 | 48 | >1000 | 180 |
| " | 117 | 32 | >1000 | 125 |
| " | 130 | 22 | >1000 | 110 |
| " | 140 | 18 | >1000 | 73 |
| " | 148 | 14 | >1000 | 60 |
| " | 158 | 11 | >1000 | — |
| Stearic Acid U.S.P. | 25 | 1070 | 550 | 615 |
| " | 70 | 55 | 1020 | 155 |
| None | 25 | 650 | 250 | 385 |
| None | 70 | 305 | 310 | 310 |

[1]ASTM 1238-70, Standard Capillary, 190° C, 250 psi
[2]Microdumbell, about 22 mils thick, 0.1 inch wide 0.5 inch long straight test region. Pulled at 2 inches/minute.
[3]Modulus determined from initial steepest slope of the stress-strain curve.

What is claimed is:
1. An elastomeric composition including:
(a) a neutralized sulfonated EPDM elastomeric terpolymer having about 15 to about 50 meq. zinc sulfonate groups per 100 grams of said sulfonated EPDM elastomeric terpolymers; and
(b) about 8 to about 60 parts by weight of zinc stearate based on 100 parts of said zinc neutralized sulfonated EPDM elastomeric terpolymers, said zinc stearate containing less than about 30 wt. % of stearic acid.

2. An elastomeric composition according to claim 1, wherein said zinc neutralized sulfonated EPDM elastomeric terpolymer contains about 20 to about 40 meq. of zinc sulfonate groups per 100 grams of said zinc neutralized sulfonated EPDM elastomeric terpolymer.

3. An elastomeric composition according to claim 1, wherein a concentration of said zinc stearate is about 9 to about 40 parts by weight per 100 parts of said zinc neutralized sulfonated EPDM elastomeric terpolymer.

4. An elastomeric composition according to claim 1, wherein a concentration of said zinc stearate is about 20 to about 50 parts by weight per 100 parts of said zinc neutralized sulfonated EPDM elastomeric terpolymer.

5. A composition according to claim 1, wherein said EPDM elastomeric polymer has about 40 to about 80 wt. % of ethylene, about 10 to about 53 wt. % of propylene and about 1 to about 10 wt. % of a non-conjugated diene.

6. An elastomeric composition according to claim 5, wherein said EPDM elastomeric terpolymer has an Mn of about 10,000 to about 200,000.

7. A composition according to claim 5, wherein said non-conjugated diene is selected from the group consisting of 1,4-hexadiene, dicyclopentadiene, alkylidene substituted norbornenes, alkenyl substituted norbornenes or tetrahydroindene.

8. A composition according to claim 7, wherein said non-conjugated diene is 5-ethylidene-2-norbornene.

9. A composition according to claim 5, wherein a concentration of said zinc stearate is about 10 to about 60 parts by weight per 100 parts of said zinc neutralized sulfonated EPDM elastomeric terpolymer.

10. A composition according to claim 9, wherein said zinc stearate contains less than about 10 wt. % of stearic acid.

11. A composition according to claim 10 further including at least one additive being selected from the group consisting of fillers, oils, waxes, and polyolefinic thermoplastics and mixtures thereof.

* * * * *